United States Patent
Sterling et al.

(10) Patent No.: US 12,002,368 B2
(45) Date of Patent: Jun. 4, 2024

(54) HOST AIRCRAFT WITH MOBILE DEVICE-BASED SYSTEM FOR COLLECTING AND DISSEMINATING FLIGHT DATA

(71) Applicant: The Boeing Company, Chicago, IL (US)

(72) Inventors: Millie Irene Sterling, Wiesbaden (DE); André Brodbeck Dugas, Englewood, CO (US); Joerg Robert Oliver Schmidt, Phoenix, AZ (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 17/578,640

(22) Filed: Jan. 19, 2022

(65) Prior Publication Data

US 2022/0366795 A1    Nov. 17, 2022

Related U.S. Application Data

(60) Provisional application No. 63/187,327, filed on May 11, 2021.

(51) Int. Cl.
*G08G 5/00* (2006.01)
*B64D 45/00* (2006.01)

(52) U.S. Cl.
CPC ........... *G08G 5/0013* (2013.01); *B64D 45/00* (2013.01); *G08G 5/0021* (2013.01); *B64D 2045/0065* (2013.01)

(58) Field of Classification Search
CPC .... G08G 5/0013; G08G 5/0021; B64D 45/00; B64D 2045/0065; B64D 2045/0085; B64F 5/60; G07C 5/0841; G07C 5/008; H04W 4/42; H04W 4/38
See application file for complete search history.

(56) References Cited

U.S. PATENT DOCUMENTS

| | | | |
|---|---|---|---|
| 9,881,507 B2 | 1/2018 | Rencher et al. | |
| 10,796,508 B2 | 10/2020 | Lonski et al. | |
| 2013/0085711 A1* | 4/2013 | Modi | G01C 22/006 702/141 |
| 2016/0133137 A1* | 5/2016 | Rencher | G08G 5/0021 701/537 |
| 2018/0372499 A1 | 12/2018 | Abdelrahman et al. | |
| 2020/0358894 A1 | 11/2020 | Mahaveer et al. | |
| 2021/0049837 A1 | 2/2021 | Sushrut et al. | |

* cited by examiner

*Primary Examiner* — Shon G Foley
(74) *Attorney, Agent, or Firm* — Quinn IP Law

(57) ABSTRACT

A host aircraft includes a flight data system, the latter including a mobile device, central data server, and transceiver. The mobile device has a processor, memory programmed with a method embodied as computer-readable instructions, and a radio frequency (RF) communications circuit, GPS receiver, and sensor suite. The sensor suite collects raw flight data. Execution of the instructions by the processor causes the mobile device to process the raw flight data into synthesized data, and filter out human-induced motion of the mobile device from the synthesized data using a filtering model, and thereby generate time-stamped filtered flight data. The central data server is in wireless communication with the RF communications circuit, and receives the time-stamped filtered flight data therefrom. The transceiver, which is communicatively coupled to the central data server, disseminates the time-stamped filtered flight data to a user located remotely from the host aircraft.

20 Claims, 7 Drawing Sheets

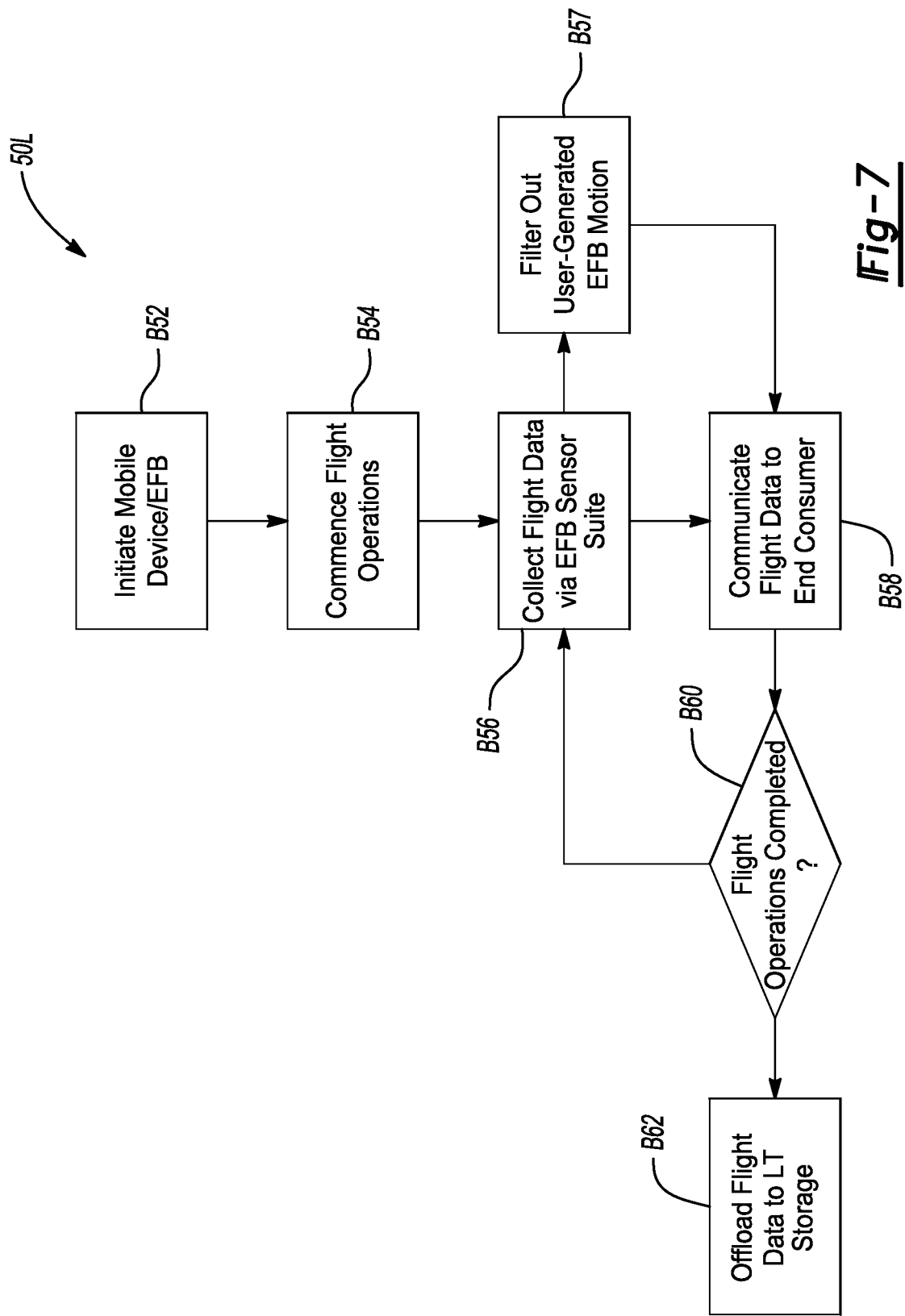

HOST AIRCRAFT WITH MOBILE DEVICE-BASED SYSTEM FOR COLLECTING AND DISSEMINATING FLIGHT DATA

CROSS-REFERENCE TO RELATED APPLICATIONS

This application claims priority to and the benefit of U.S. Provisional Application No. 63/187,327, filed on May 11, 2021, which is hereby incorporated by reference in its entirety.

TECHNICAL FIELD

The subject disclosure relates to host aircraft-based systems and accompanying methods for collecting and disseminating flight data to one or more remote user devices.

BACKGROUND

Historically, extensive ground-based networks of radar tracking stations were used to track, coordinate, and control air traffic. More recently, evolving capabilities of digital satellite-based communication systems have enabled the deployment of low-frequency (~0.25 Hz) Automatic Dependent Surveillance-Broadcast, or ADS-B for short, as a reliable and accurate source for communicating collected flight data. As understood in the art, ADS-B is a computer system that broadcasts a host aircraft's position and altitude via available satellite-based communication links and relays. Using ADS-B, pilots and air traffic controllers are better able to visualize the relative positions and flight trajectories of aircraft operating within the same airspace.

Extraction of flight data in real-time outside of a conventional air traffic control context can be labor-intensive and time-consuming. Avionic sensor data routinely collected using an onboard flight data recorder (FDR), for instance, is accessed post-flight with the assistance of specially-configured computer-based interrogating equipment. The interrogating equipment is used to extract collected binary data from hard drives or other memory devices, and to interpret the binary data or patterns thereof as meaningful flight events. Real-time access may be achieved using an Aircraft Interface Device (AID). However, AID-facilitated access to data stored on an FDR is a relatively complicated process often reserved for supporting official investigative purposes, flight operations quality assurance (FOQA) tasks, and other critical tasks. Additionally, present market adoption of AID remains low due largely to the high cost, time, and effort required to retrofit existing aircraft.

SUMMARY

In view of the foregoing discussion, a need exists for a simplified low-cost solution for accessing and communicating certain types of collected flight data in real-time, possibly for purposes such as determining takeoff or "wheels-up" and landing/"wheels-down" times, reporting air turbulence or flight level changes, takeoff and landing distances/velocities, cabin pressure anomalies, etc. Extensions of the present teachings can possibly include collecting and disseminating information pertaining to real-time tracking and evaluating of flight-related activities, such as propulsor/engine on/off status, crew punctuality/locations, ongoing de-icing or anti-icing efforts, aircraft weight estimation, hard landing and/or runway condition evaluations, and other beneficial information.

In particular, hardware and software-based solutions, whether implemented via distributed hardware, using a software application ("app"), or otherwise, are disclosed herein for collecting and communicating certain types of aircraft flight data using a suitably equipped mobile device, e.g., a tablet computer, a smart phone, or another appropriately configured portable electronic device. The solutions rely on collection of raw flight data using onboard/resident sensor capabilities of the mobile device itself in lieu of, e.g., pilot reports, aircraft sensors, Aircraft Communications Addressing and Reporting System (ACARS) messages, or other traditional techniques.

In the various embodiments described herein, the mobile device is equipped with a Global Positioning System (GPS) receiver and possibly implemented as an Electronic Flight Bag (EFB). As appreciated in the art, an EFB may be embodied as a sensor suite-equipped tablet computer or an installed device, typically but not necessarily one running the iOS operating system. Exemplary constituent sensors of the sensor suite may include one or more of a multi-axis accelerometer, a gyroscope, a barometer, or a compass/magnetometer. The present methodology leverages sensory capabilities of the available sensors when making collected flight data available to remote user devices accessible by data consumers or users in real-time. Future sensors not specifically addressed herein but possibly included in the ongoing evolution of EFB hardware and software capabilities include hygrometers, thermometers, lidar sensors, etc., any or all of which may have certain utility within the scope of the subject disclosure. Thus, the particular hardware and software configuration of the sensor suite housed within the mobile device may vary within the scope of the disclosure, and in accordance with the intended use or application(s).

As will be appreciated by those skilled in the art in view of the following discussion of the various Figures, the present solutions leverage sensor and processing capabilities of a handheld mobile device to extract more real-time information about a given flight than is customarily made available by ADS-B and other conventional data sources. Moreover, the methods set forth below do so expeditiously without requiring the host aircraft or its flight crew to manually report the collected flight data. Using the GPS receiver, recorded events may be annotated with precise time-stamps and accurate locations, thereby providing actionable or informative levels of specificity to the collected and reported flight data.

Additionally, the disclosed solutions provide a model-based process for differentiating between motion of the host aircraft and human-induced motion of the mobile device. The mobile device is expected to be freely interacted with by a flight crew, e.g., as a pilot picks up, tilts, and rotates the mobile device in order to view displayed information of interest before touching the screen and eventually setting the mobile device down again. As the mobile device is handheld, and thus not secured to the host aircraft via a fixture during the contemplated user interactions, the mobile device at times can be inadvertently dropped or bumped in the course of its ordinary use. Such motion is detected and reported by the sensor suite as aggressive data spikes, which absent the present teachings can lead to inaccurate flight information calculations and reporting.

Thus, the subject disclosure combines collected data from the sensor suite of the mobile device, knowledge of expected host aircraft motion, and knowledge of typical user motions to differentiate between sensor readings descriptive of motion of the host aircraft from that of motion imparted to the mobile device by actions of the user. The user motions are then filtered out using the approaches described herein, e.g., using a statistical filtering model programmed into memory of the mobile device.

In a particular exemplary embodiment, a flight data system for use aboard a host aircraft includes the mobile device, a central data server, and a transceiver. The mobile device, e.g., an iPad® or another suitably configured tablet computer, an iPhone® or another suitably equipped smartphone, or another portable electronic device, includes a processor, non-transitory memory programmed with computer/processor-readable and executable instructions, a radio frequency (RF) communications circuit, a GPS receiver, and a sensor suite. The sensor suite is configured to collect raw flight data, with the content of the raw flight data varying with the configuration of the sensor suite as noted above.

Execution of the instructions by the processor causes the mobile device, possibly in response to use of a software application ("app") residing thereon, and via generation and communication of corresponding electronic control signals, to process the raw flight data into a synthesized data set. This may entail processing, analyzing, and possibly deleting some of the above-noted raw flight data as needed. The mobile device then filters out human-induced motion of the mobile device from the synthesized data set, e.g., using any or all of a statistical filtering model, bandpass filters, thresholds, etc. The mobile device is able to generate time-stamped filtered flight data in this manner.

The central data server, which is in secure wireless communication with the RF communications circuit of the mobile device, ultimately receives the time-stamped filtered flight data from the mobile device in certain embodiments. The transceiver, which is communicatively coupled to the central data server, transmits or otherwise disseminates the time-stamped filtered flight data to an external device, which in turn is located remotely from the mobile device or the host aircraft ("remote user device").

In a possible hardware configuration, the sensor suite includes a barometer configured to generate cabin pressure readings as part of the raw flight data. The time-stamped filtered flight data in this particular instance includes time-stamped takeoff and landing times of the host aircraft. Such times are determined via the mobile device in a manner that is based on the cabin pressure readings.

Alternatively or concurrently, the sensor suite may include at least one multi-axis accelerometer configured to generate a set of composite acceleration readings as part of the raw flight data. In such an embodiment, the time-stamped filtered flight data may include time-stamped turbulence data of the host aircraft based at least in part on the composite acceleration readings.

Execution of the computer-readable instructions by the processor causes the mobile device to filter out the human-induced motion of the mobile device from the synthesized data set, such as by calculating a rolling standard deviation of the composite accelerometer readings. The statistical filtering model performs such a calculation. The statistical filtering model can also or alternatively calculate a rolling average of a sum of absolute values of the composite accelerometer readings, and thereafter detect a dynamic attitude of the mobile device using the rolling average, with "attitude" being inclusive of velocity (speed and heading) thereof.

In a possible configuration, the sensor suite includes a gyroscope configured to output, as part of the above-noted raw flight data, an angular rate signal indicative of rotation of the mobile device. The mobile device in such an embodiment is configured to detect the human-induced motion based in part on the angular rate signals from the gyroscope.

Within the scope of the subject disclosure, the remote user device can be optionally embodied as a computer system of an additional aircraft, with the transceiver configured to disseminate the time-stamped filtered flight data to the additional aircraft in such a representative use scenario. Communication may be via an air-to-air signal transmission or a radio broadcast, which in turn may encompass point-to-point transmission or relayed transmission using satellite, aircraft, or ground-based relay. The remote user device can also include an air traffic control tower or tracking station, with the transceiver being configured to disseminate the time-stamped filtered flight data to the air traffic control tower or tracking station as an air-to-ground signal transmission. Likewise, nothing precludes air-to-air communications, with possible beneficial uses with airborne/orbiting air traffic control platforms.

Also disclosed herein is a method for collecting and disseminating flight data aboard a host aircraft using a flight data system, with the flight data system including the above-described mobile device. The method according to a non-limiting exemplary embodiment includes collecting GPS data using a GPS receiver located aboard the host aircraft, e.g., as an integral part of the mobile device. The method also includes collecting raw flight data via a sensor suite of the mobile device, and then processing the raw flight data to generate a synthesized data set. Additionally, the method in this embodiment includes filtering out human-induced motion of the mobile device from the synthesized data set, via a statistical filtering model of the mobile device, to thereby generate time-stamped filtered flight data.

The method in this non-limiting representative implementation may include wirelessly transmitting the time-stamped filtered flight data to a central data server located aboard the host aircraft, via an RF communications circuit of the mobile device, and receiving the time-stamped filtered flight data via the central data server. Thereafter, the method includes disseminating the time-stamped filtered flight data via a transceiver coupled to the central data server, possibly including transmitting an air-to-ground signal to an air traffic control tower and/or broadcasting a message to another aircraft directly or using one or more relay stations. In some instances, the remote user device may be one or more other EFB/mobile devices, with a software-based app on the mobile device possibly used to launch the method and update the other EFB(s).

A non-transitory computer-readable medium is also disclosed herein, on which is recorded instructions for collecting and disseminating flight data aboard a host aircraft. Execution of the instructions by a processor of a mobile device causes the mobile device to collect GPS data using a GPS receiver, collect raw flight data using a sensor suite, process the raw flight data into a synthesized data set, and filter out human-induced motion of the mobile device from the synthesized data set, via a statistical filtering model, to thereby generate time-stamped filtered flight data. The mobile device then wirelessly transmits the time-stamped filtered flight data to a remote user device via an RF communications circuit, with the remote user device in this embodiment being inclusive of at least one of a central data server located aboard the host aircraft or another mobile device.

The above summary is not intended to represent every possible embodiment or every aspect of the subject disclosure. Rather, the foregoing summary is intended to exemplify some of the novel aspects and features disclosed herein. The above features and advantages, and other features and advantages of the subject disclosure, will be readily apparent from the following detailed description of representative embodiments and modes for carrying out the subject disclosure when taken in connection with the accompanying drawings and the appended claims.

BRIEF DESCRIPTION OF THE DRAWINGS

The drawings described herein are for illustrative purposes only, are schematic in nature, and are intended to be exemplary rather than to limit the scope of the disclosure.

FIG. 7 is a flow chart describing an exemplary method for collecting and disseminating flight data using the flight data system as depicted in FIG. 2.

DETAILED DESCRIPTION

The subject disclosure may be embodied in many different forms. Representative examples are shown in the various drawings and described in detail below, with the understanding that the described embodiments are an exemplification of the disclosed principles, and not limitations of the broad aspects of the disclosure. To that end, elements and limitations described below, but not explicitly set forth in the claims, should not be incorporated into the claims, singly or collectively, by implication, inference, or otherwise. Moreover, the drawings discussed herein may not be to scale, and are provided purely for instructional purposes. Thus, the specific and relative dimensions shown in the Figures are not to be construed as limiting.

Additionally, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Further, the words "example" or "exemplary" are used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward direction of travel of an aircraft or other vehicle.

Figure 1:
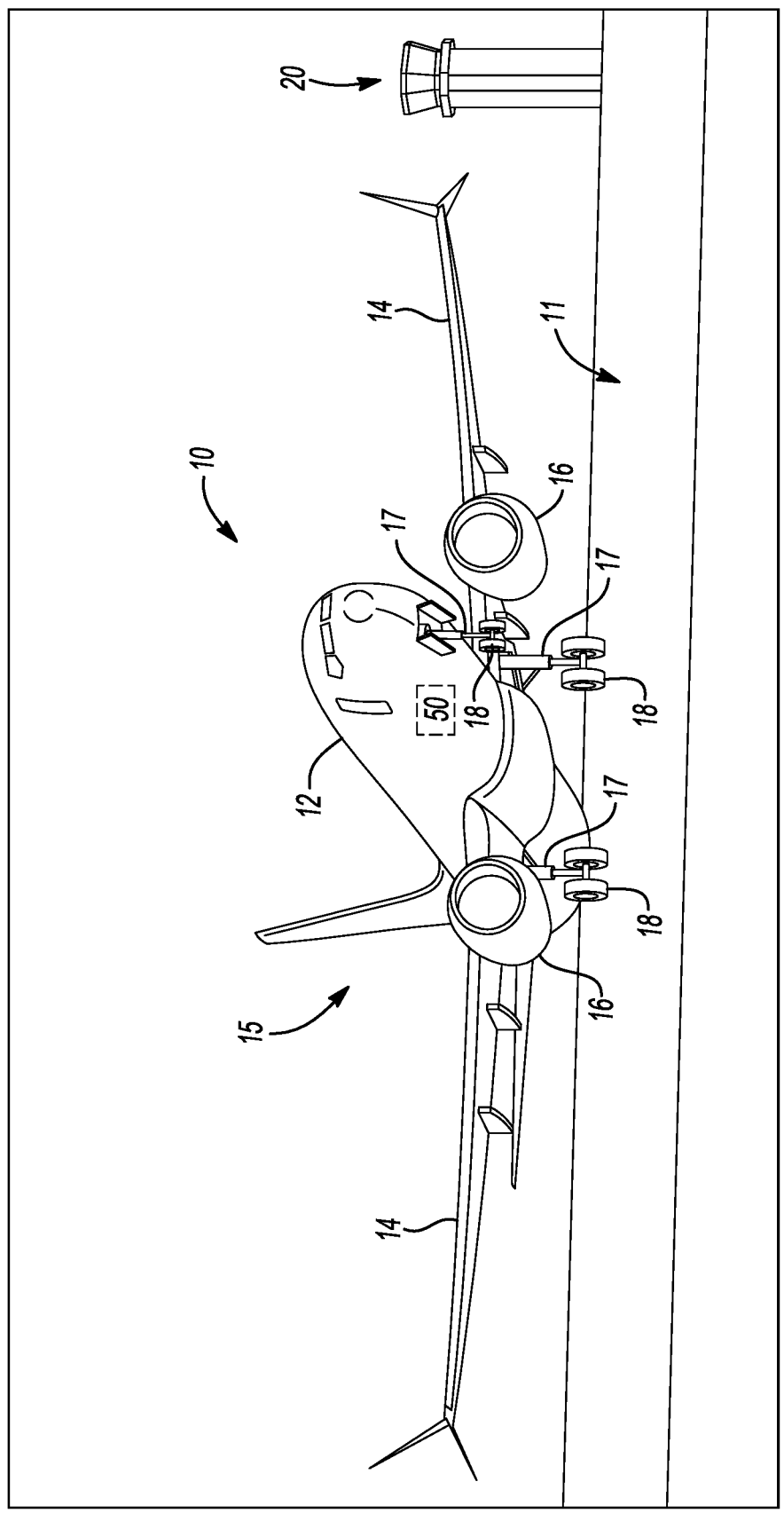
FIG. 1 is a perspective view illustration of a representative host aircraft equipped with a flight data system operable for collecting and disseminating flight data using a suitably equipped mobile device in accordance with the subject disclosure.

Referring to the drawings, wherein like reference numbers refer to the same or like components in the several Figures, a host aircraft 10 is depicted relative to a runway surface 11 in a posture that the host aircraft 10 might assume during takeoff and landing operations. The host aircraft 10 in the non-limiting exemplary configuration of FIG. 1 is a fixed-wing commercial or passenger aircraft, and thus includes a fuselage 12 connected to a set of wings 14, a tail or empennage assembly 15, and one or more propulsors 16, e.g., jet turbine engines, open or closed propeller systems, etc. In this representative stage of flight, landing gear assemblies 17 of the host aircraft 10 are in an extended position, with connected set of road wheels 18 exposed below the fuselage 12. For perspective, a representative air traffic control (ATC) tower 20 is shown in FIG. 1, with ongoing radio communications occurring between aircrew (not shown) of the host aircraft 10 and the ATC tower 20.

Within the scope of the subject disclosure, a flight data system 50 as described in detail below resides on or within the host aircraft 10. As such, the host aircraft 10 is "host" to the flight data system 50 in the sensor of providing requisite support structure and possible communications infrastructure. Operation of the flight data system 50 occurs during takeoff and landing maneuvers as shown in FIG. 1, as well as ascent, cruise, and descent stages of flight. Use of the flight data system 50 makes beneficial use of collected sensor data aboard the host aircraft 10, in addition to or, at times, in lieu of relying on radio-based/manual pilot reports, Aircraft Communications Addressing and Reporting System (ACARS) messages, ADS-B interactions, or other legacy or integrated communications systems and data of the types generally described above.

Figure 2:
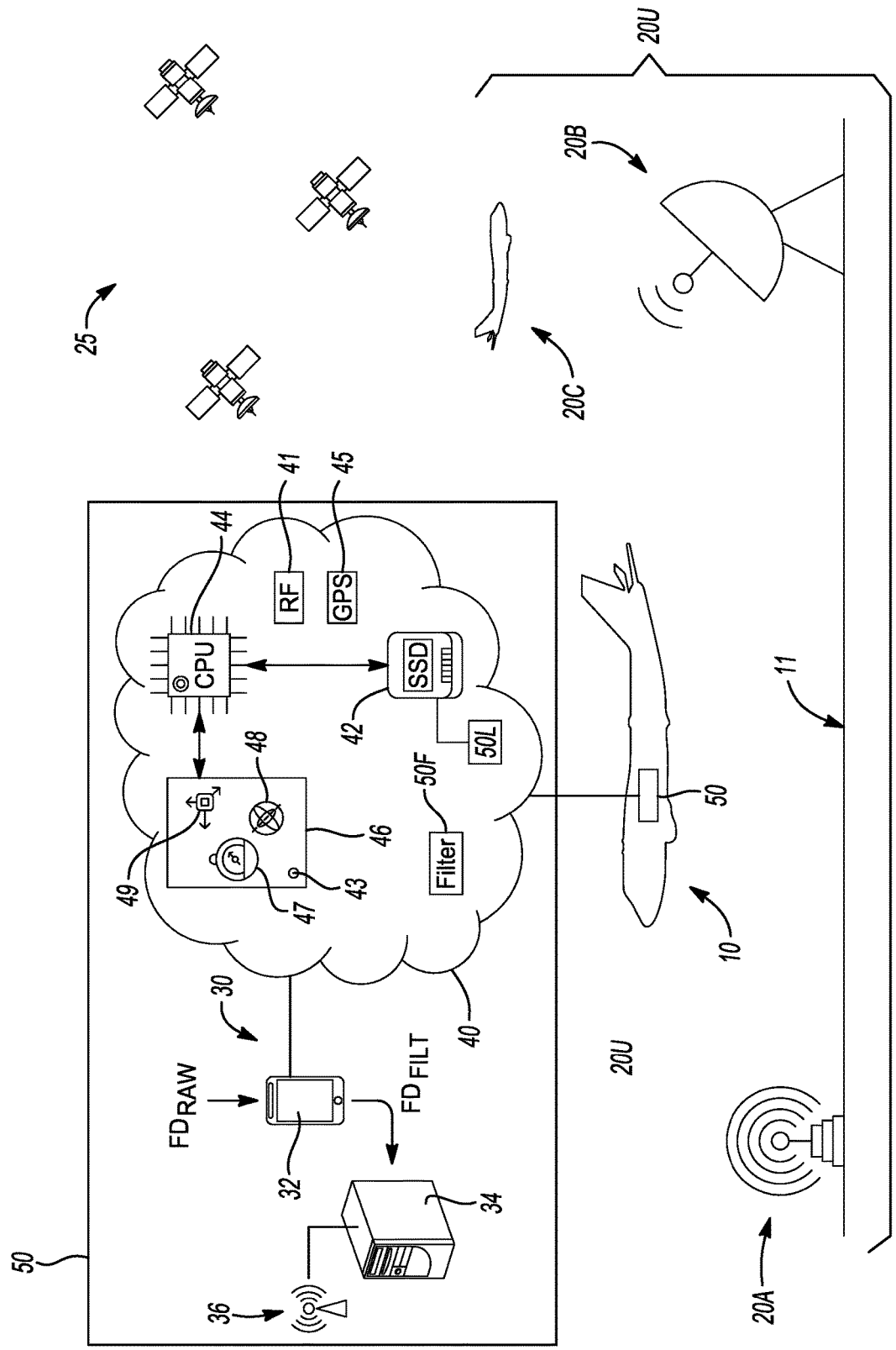
FIG. 2 is a schematic illustration of an exemplary implementation of the flight data system described herein.

Referring to FIG. 2, the flight data system 50 is represented schematically in accordance with a possible embodiment. The flight data system 50 in the illustrated configuration includes a mobile device 30, a central data sever 34, and a transceiver 36, the functionality and structure of each of which is described in detail below. A key technical aspect of the flight data system 50 is the leveraged use of miniaturized hardware and associated software capabilities of the mobile device 30, e.g., a commercial off-the-shelf portable electronic device, typically a tablet computer or smartphone running iOS or another compatible operating system. The mobile device 30 contemplated herein includes a readily accessible touch screen 32 serving as an intuitive graphical user interface, enabling a user to pick up, interact with, and put down the mobile device 30 as needed throughout a flight of the host aircraft 10 and during pre-flight or post-flight activities.

Hardware capabilities of the mobile device 30 are specially designed for artificial intelligence/machine learning computations that rely on large matrix operations, which are better suited than conventional avionics hardware when running event detection algorithms of the type described herein, e.g., the event detection logic 50L shown in FIG. 7. The present solutions rely on the designed modularity and ease of communications of the mobile device 30 with other networked devices, via the internet or other networked connectivity, enabling the use of the mobile device 30 as an Internet-of-Things (IoT) sensor with comparatively low developmental effort.

To that end, the mobile device 30 used herein includes a Global Positioning System (GPS) receiver 45 and a sensor suite 40, with the GPS receiver 45 being in communication with an orbiting constellation of GPS satellites 25 as appreciated in the art. The mobile device 30 also includes a central processing unit (CPU) or processor 44, sufficient amounts of memory 42, i.e., computer-readable medium or media such as a solid-state drive (SSD)-based memory programmed with computer-readable instructions embodying the event detection logic 50L, and a radio frequency (RF) communications circuit 41. The sensor suite 40 is configured herein to collect raw flight data ($FD_{RAW}$). As described below with reference to FIGS. 4-6, execution of the computer-readable instructions by the processor 44 causes the mobile device 30, using a statistical filter 50F, to filter out human-induced motion of the mobile device 30 from a processed and possibly reduced set ("synthesized data set") of the raw flight data ($FD_{RAW}$) generated by the sensor suite 40, to thereby generate time-stamped filtered flight data ($FD_{FILT}$).

The central data server 34 is in wireless communication with the mobile device 30 via the RF communications circuit 41, and is configured to receive the time-stamped filtered flight data ($FD_{FILT}$) therefrom during the course of flight of the host aircraft 10. Aboard the host aircraft 10, other mobile devices (not shown) equipped as EFBs could be present in communication with the mobile device 30. The transceiver 36, inclusive of one or more send and receive antennas, is coupled to the central data server 34, with the transceiver 36 being configured to disseminate the filtered flight data ($FD_{FILT}$) to a remote user device 20U, i.e., a physical data consumer located remotely from the host aircraft 10.

Upon receipt by the remote user device 20U, a user or consumer of the filtered flight data ($FD_{FILT}$) could, by way of example and not limitation, display the filtered flight data ($FD_{FILT}$) on a suitable display screen for reference, or feed the filtered flight data ($FD_{FILT}$) into another system, such as to update expected arrival times or perform other suitable response or control actions. Within the scope of the disclosure, the remote user device 20U may include any or all of the ATC tower 20 of FIG. 1 or various similar ATC towers 20A located along a flight route of the host aircraft 10, one or more ground or airborne tracking stations 20B, and/or additional aircraft 20C located in general proximity to the host aircraft 10, or perhaps following a distance behind the host aircraft 10 while traveling in a similar flight path.

Further regarding the sensor suite 40, representative sensors housed within the mobile device 30 include a barometer 47, which is configured to generate, as the raw flight data ($FD_{RAW}$), a set of barometric pressure readings indicative of cabin pressure within the host aircraft 10, as opposed to atmospheric pressure readings. As explained below, GPS capabilities of the mobile device 30 enable the mobile device 30 to generate and output time-stamped filtered flight data ($FD_{FILT}$) using the raw flight data ($FD_{RAW}$), inclusive of such barometric pressure readings.

The sensor suite 40 may also include one or more multi-axis accelerometers 49 configured to generate, as the raw flight data ($FD_{RAW}$), a set of composite accelerometer readings, i.e., nominal XYZ acceleration components for a representative XYZ Cartesian reference frame. The filtered flight data ($FD_{FILT}$) in such an embodiment may be inclusive of such composite accelerometer readings, with different statistical filtering techniques described below for filtering out human-induced motion of the mobile device 30 from the raw flight data ($FD_{RAW}$) when generating the time-stamped filtered flight data ($FD_{FILT}$).

Additionally, the sensor suite 40 may include a gyroscope 48 configured to generate, as part of the raw flight data ($FD_{RAW}$), a set of gyroscopic rotational readings in the form of angular rate signals. The mobile device 30 is configured to detect the above-noted human-induced motion of the mobile device 30 based on such readings. Additional sensors 43 may be used as part of the sensor suite 40, possibly including one or more of a compass/magnetometer, a thermometer, a hydrometer, a hygrometer, a lidar sensor, etc., and thus the sensory capabilities of the mobile device 30 may vary with the intended application.

As understood in the art, modern sensor technologies of the types housed within modern iOS-based tablet computers such as the iPad® and its variants, particularly those configured for use as Electronic Flight Bags (EFBs) as described above, are typically updated on an average 3-year cycle, which is exceptionally short relative to a typical aircraft generation design cycle average of about 25 years. With respect to internal computing hardware, evolving systems-on-a-chip (SoCs) used to implement the processing, modeling, machine learning, and other functions of the mobile device 30 are an order of magnitude more powerful, and much more flexible, than those used to implement aeronautical systems aboard older aircraft such as the host aircraft 10 shown in FIG. 1. Moreover, the sheer volume of data generated by a single flight of the host aircraft 10 using such legacy systems may be on the order of several gigabytes or terabytes, vastly complicating timely extraction, dissemination, and beneficial use of limited portions of such data.

With respect to computer and computer-related terminology used above, implementations of the memory 42, the processor 44, and the central data server 34 may encompass various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory is capable of storing machine readable instructions in the form of one or more software or firmware programs or routines, combinational logic circuit(s), input/output circuit(s) and devices, signal conditioning, buffer circuitry and other components, which can be accessed and executed by one or more processors to provide a described functionality.

Communication occurring between the constituent processing nodes of the flight data system 50 of FIG. 2 includes exchanging data signals, including, for example, electrical signals via a conductive medium, electromagnetic signals via air, optical signals via optical waveguides, etc. The data signals may include discrete, analog and/or digitized analog signals representing inputs from sensors, actuator commands, and communication between controllers. The term "signal" refers to a physically discernible indicator that conveys information, and may be a suitable waveform (e.g., electrical, optical, magnetic, mechanical, or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 3:
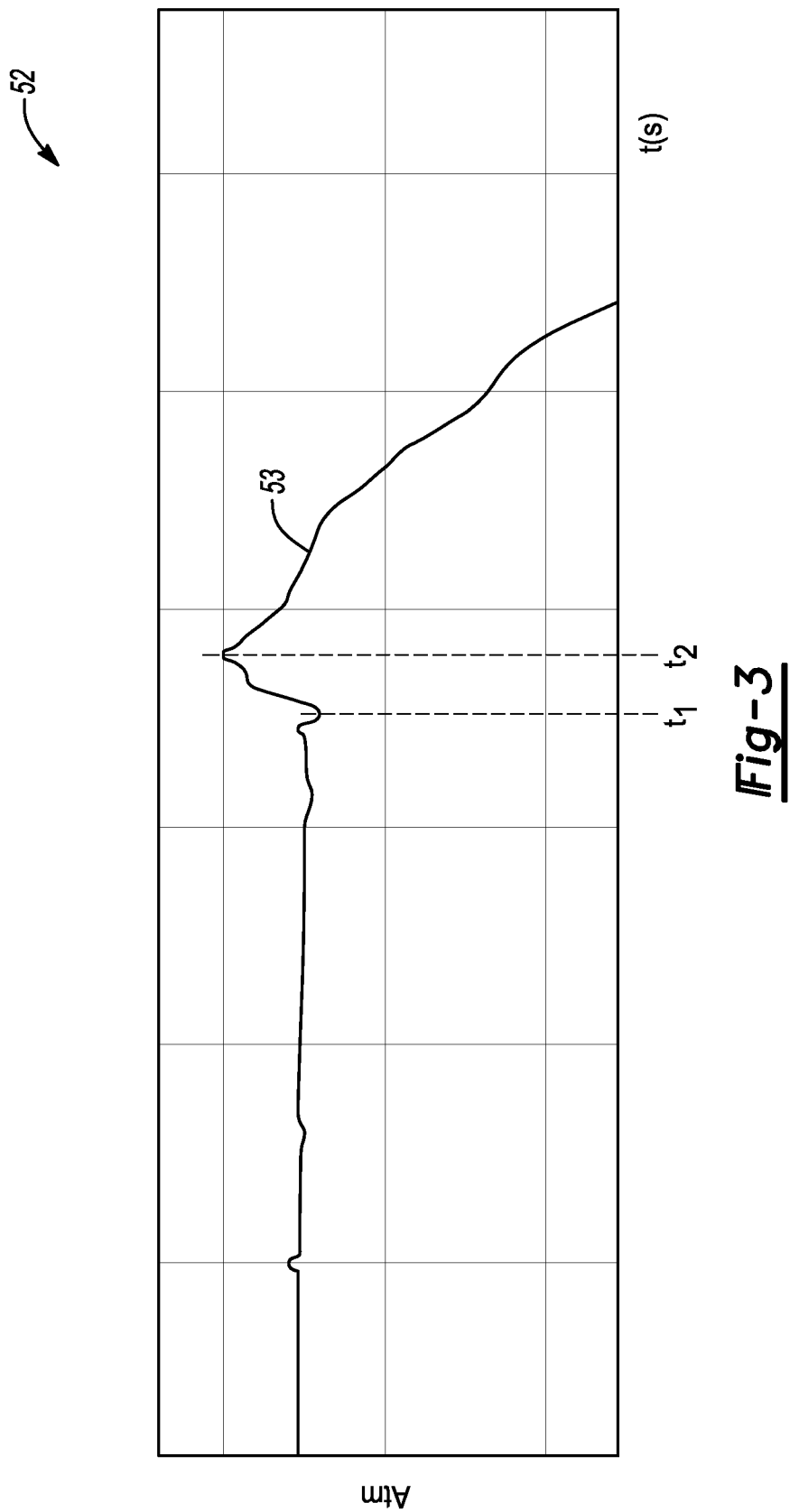
FIG. 3 is a time plot of representative barometric pressure readings collected aboard the host aircraft of FIGS. 1 and 2 using a mobile device in accordance with the subject disclosure.

Referring briefly to FIG. 3, a representative trace 52 is shown that is representative of cabin pressure readings 53 in atmospheres (Atm), with the cabin pressure readings 53 generated in real-time and time-stamped by operation of the above-described barometer 47 and the GPS receiver 45 of FIG. 2. As appreciated in the art, commercial aircraft such as the host aircraft 10 of FIG. 1 use an environmental control system to slightly over-pressurize an aircraft cabin at takeoff, which in FIG. 3 occurs commencing at about $t_1$ and continuing until about $t_2$. Likewise, a cabin of the host aircraft 10 is slightly under-pressurized at landing. Use of the barometer 47 located within the mobile device 30 is thus helpful for determining takeoff and landing times, otherwise known as "off-wheels" and "on-wheels" or "off and on" times. Such information is used throughout an airline's operation, and form significant milestones on any flight.

The barometer 47 in this optional embodiment feeds the time-stamped barometer readings 53, once processed by the mobile device 30 into the above-noted synthesized data set, into a filtering algorithm, i.e., the statistical filtering model 50F of FIG. 2 as explained below. Filtering in this context properly accounts for human motion of the mobile device 30. The filtered flight data ($FD_{FILT}$) shown in FIG. 2 may therefore include the cabin pressure readings 53 of FIG. 3. When communicated to down-line systems such as the ATC tower(s) 20A, tracking station(s) 20B, and/or additional aircraft 20C of FIG. 2, the exact location of the host aircraft 10 on or relative to the runway surface 11 may be extracted as part of the event identification functionality of the flight data system 50.

Those skilled in the art will appreciate the possible range of sensor applications within the scope of the disclosure. For instance, detection of Clear Air Turbulence (CAT) and other turbulence, aircraft out, off, on, in (OOOI) times, flight phase identification (climb, cruise, descent, etc.), flight level changes, landing analysis such as velocity at touchdown, exact location of touchdown, landing distance, etc., takeoff analysis such as takeoff distance, velocity, wheels-off location, and other data, engine start/shutdown, etc.

Other usage possibilities include detection and reporting of thrust reversers, runway surface conditions, approach patterns, crew punctuality and location tracking, detailed deicing/anti-icing analytics, aircraft weight estimation, GPS spoofing and jamming events, and hard bouncing/landing detections. Still other conceivable data may pertain to usage of lavatories, e.g., from a detected number of flushes, multiplied by the amount of water consumed per flush, holding, cabin pressure anomalies, congested taxiways and hotspots, rejected takeoff, and height loss in climb are all possibilities for collection by the sensor suite 40, depending on the configuration thereof.

For the various raw flight data ($FD_{RAW}$) collected herein, once such data has been reduced to a flight event-specific synthesized data set, the mobile device 30 is configured to differentiate human motion of the mobile device 30 from expected aircraft motion. While the sensor suite 40 can be used to detect many significant flight events during a given flight, the mobile device 30 considered herein functions as a handheld device, i.e., free from external mounts or fixturing. As such, the mobile device 30 may be grasped, moved within the host aircraft 10, and interacted with by a human user. The expected human interactions, however, can falsify or confuse the event detection logic 50L when the mobile device 30 relies on the collected sensor readings. Thus, the mobile device 30 is configured to combine data from the sensor suite 40 and knowledge of expected motions of the host aircraft 10 and users of the mobile device 30 to properly and accurately distinguish between the two.

For example, within the sensor suite 40 of FIG. 2 one may find the gyroscope 48 and the multi-axis accelerometer 49, which can at times output extreme data spikes when the mobile device 30 is lifted, tilted, or dropped. The gyroscope 48 and the multi-axis accelerometers 49 in particular would tend to produce more extreme readings than those that would typically be indicated by normal aircraft operation.

Figure 4:
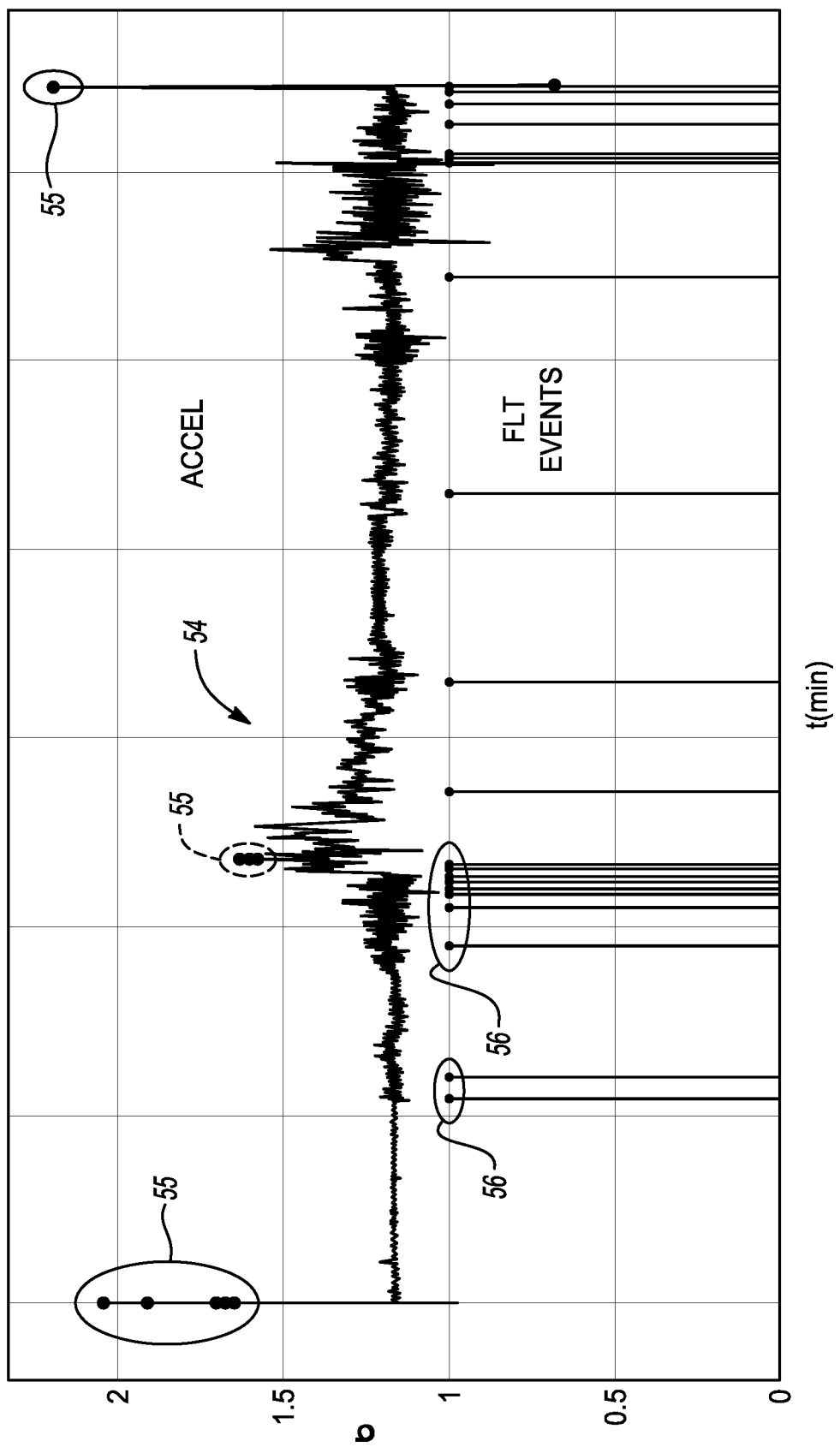
FIGS. 4-6 are representative plots of various types of flight data that may be collected, filtered, and disseminated using the flight data system shown in FIG. 2.

Referring to FIG. 4, for instance, an acceleration trace 54 represents variation over time of an acceleration (ACCEL) vector component sum versus. The sensor suite 40 may include the multi-axis accelerometer 49, which are configured to generate, as the raw flight data ($FD_{RAW}$), a set of composite accelerometer readings of trace 54. Flagged anomalies are indicated by points 55, with valid flight events (FLT EVENTS) indicated by points 56, i.e., discrete ON/OFF states of attendant functions or systems.

Figure 5:
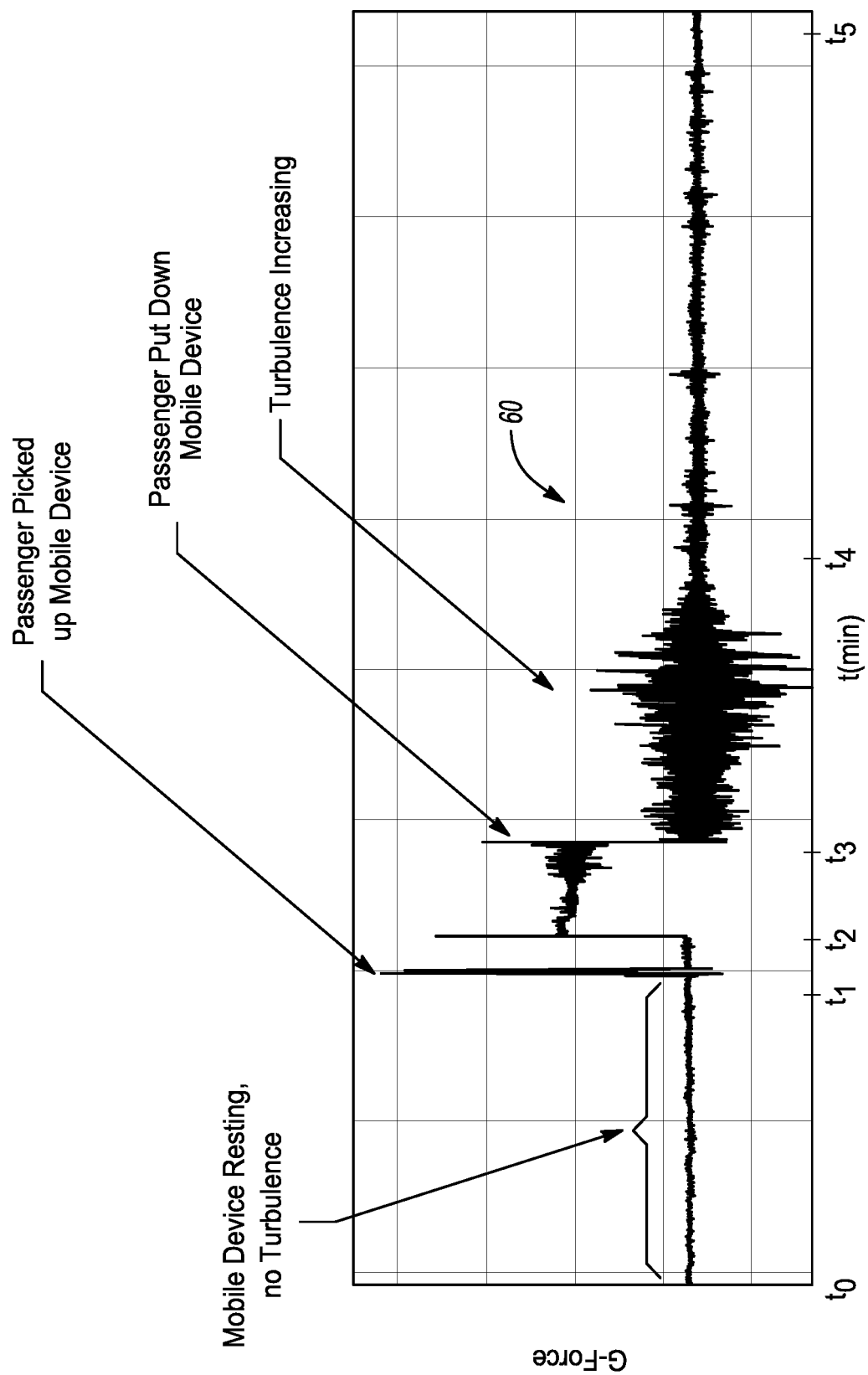

FIG. 5 illustrates another trace 60, this time a gravitational force (G-Force) relative to time (t), nominally shown in minutes (min). Another method uses the absolute values of each of the three components of the acceleration vector as measured by the multi-axis accelerometer 49, which yields a measure where the value of the rolling average can be used to detect rotation of the mobile device 30 without considering the readings of the gyroscope 48. If the rotations are abrupt, it will be visible in sharp changes in the rolling average, indicating human interference. After the mobile device 30 is at rest from $t_0$ to $t_1$, representative user interactions appear between $t_1$ and $t_3$, for instance as a passenger picks up the mobile device 30, handles it, and puts it back down again.

Actual flight turbulence is represented between $t_3$ and $t_4$, settling into normal steady-steady state flying between $t_4$ and $t_5$. One approach is to identify such spikes mathematically by taking the derivative of the accelerometer readings over time, and then locating the near infinite slopes. The mobile device 30 can thereafter filter out such spikes. The time-stamped filtered flight data ($FD_{FILT}$) may therefore include time-stamped turbulence data of the host aircraft 10 that is based on the composite acceleration readings. A threshold standard deviation may be used to filter out human interaction. Thus, execution of computer-readable instructions by the processor 44 of FIG. 1 causes the mobile device 30 to filter out human-induced motion of the mobile device 30 from the raw flight data ($FLT_{RAW}$) by calculating such a rolling standard deviation of the accelerometer readings.

Figure 6:
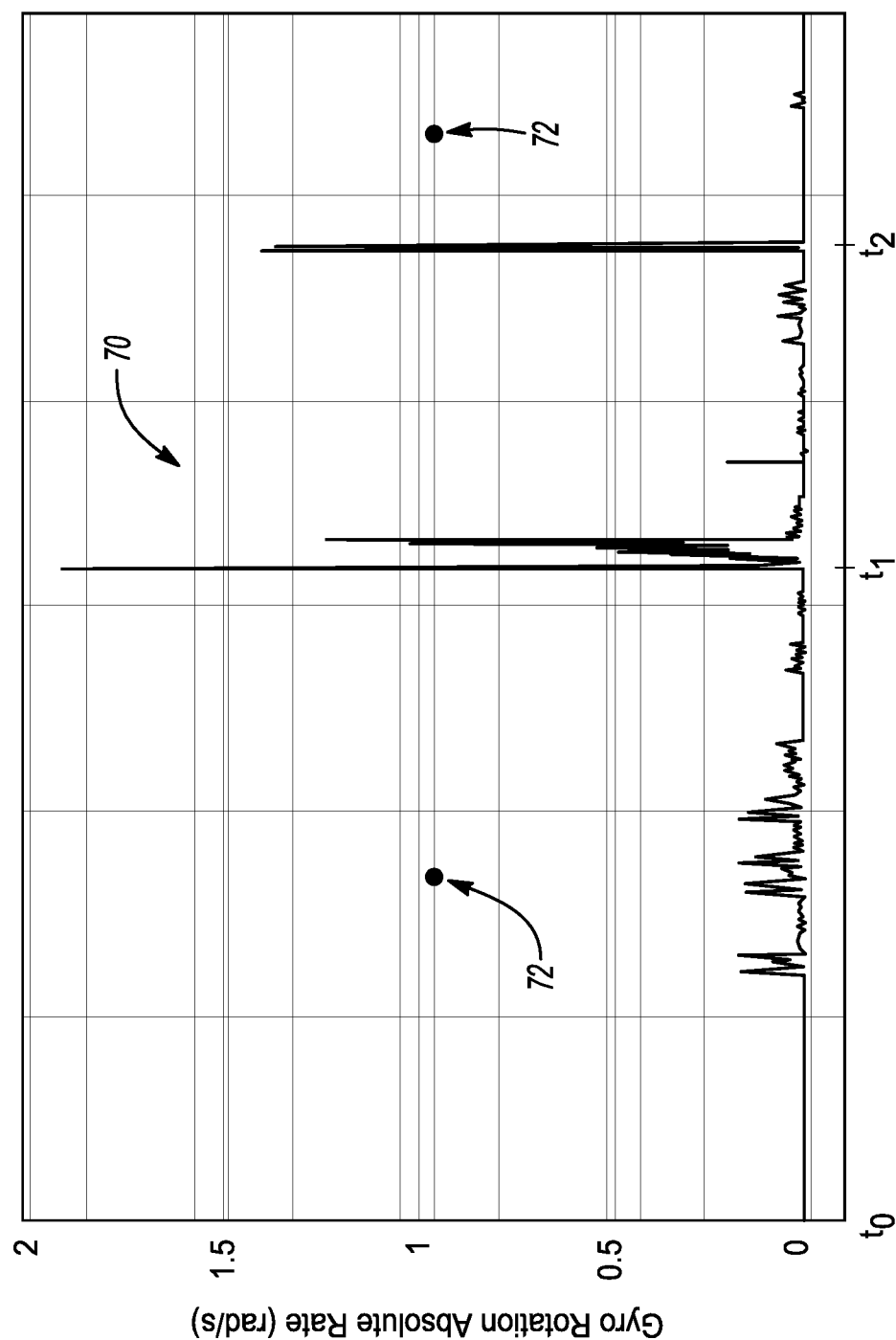

FIG. 6 depicts the trace 70, which represents an absolute rate of rotation/angular rate of the gyroscope 48 shown schematically in FIG. 2, in radians per second (rad/s) and indicative of rotation of the mobile device 30. Flight events are represented by points 72, with corresponding portions of trace 70 being indicative of such events and thus likely to be valid data. However, the spikes in trace 70 occurring at about $t_1$ and $t_2$ may be indicative of direct human interference with the mobile device 30. For instance, a pilot or crewmember might have picked up the mobile device 30 and interacted with the mobile device 30 via the touch screen 32 of FIG. 1. Extreme acceleration in any of the three axes is picked up by the gyroscope 48. In response, the mobile device 30 can purge the sensor readings of this data as a non-descriptive human interference. Normal aircraft motion-induced changes in acceleration can be seen in the smaller gyroscope spikes occurring between $t_0$ and $t_1$, and between the large spikes present at $t_1$ and $t_2$.

Referring now to FIG. 7, the event detection logic 50L described above may be described in terms of logic flow, aspects of which are executable by the processor 44 of FIG. 1 during flight operations of the representative host aircraft 10. Commencing at block B52, a pilot, crewmember, or other user initiates the mobile device 30, e.g., a suitably equipped EFB such as a tablet computer or smartphone running iOS or another compatible operating system.

Embodiments contemplated herein may be launched by accessing a software application ("app"), which may be programmed as computer-readable instructions into memory 42 of the mobile device 30, and possibly displayed as an icon or application ("app") tile on the touch screen 32, and accessible via touch interactions, as is well understood in the art. Launching the app in this manner may include prompting a user to select from available sensors of the sensor suite 40, e.g., by presenting a list of options and then allowing the user to pick from this displayed list. Alternatively, the mobile device 30 may execute a default setting by initiating sensing operations from all of the constituent sensors of the sensor suite 40. Once the mobile device 30 has been initiated in this manner, the event detection logic 50L proceeds to block B54.

At block B54, the flight crew of the host aircraft 10 shown in FIG. 1 commences flight operations. Depending on the particular stage of flight at which the mobile device 30 was initiated in block B52, this may include turning on the propulsors 16, loading passengers and/or cargo into the fuselage 12, gate departure, taxiing, takeoff, ascent, cruise, descent, landing, all the way through to subsequent shutoff of the propulsors 16 and possibly beyond. The event detection logic 50L then proceeds to block B56.

Block B56 entails collecting the raw flight data ($FD_{RAW}$) shown in FIG. 2 using the sensor suite 40 of the mobile device 30, which as noted above may be optionally configured as an EFB. The event detection logic 50L proceeds to block B57 as the raw flight data ($FD_{RAW}$) is generated.

At block B57, the mobile device 30 may first process the raw flight data ($FD_{RAW}$) to produce a synthesized data set before filtering out user-generated or induced motion of the mobile device 30. In terms of data synthesis, the mobile device 30 may process, analyze, and possibly delete some of the collected raw flight data ($FD_{RAW}$) from bock B56 as needed. For instance, when determining flight events related to turbulence, the synthesized data set may disregard or deemphasize sensory data related to, e.g., cabin pressure.

An exemplary edge computing scenario may be readily envisioned in which computing power residing on the mobile device 30 is used to process the raw flight data ($FD_{RAW}$) into the synthesized data set indicative of, e.g., air turbulence in this non-limiting embodiment. Thus, data from the multi-axis accelerometer 49 and/or the gyroscope 48 can be selected in this particular instance. In other words, the mobile device 30 would not transmit the raw flight data ($FD_{RAW}$) directly to an end user for downstream detection of a relevant flight event such as turbulence. Rather, the mobile device 30 would first reduce, combine, or otherwise synthesize the collected raw flight data ($FD_{RAW}$) into the synthesized data set as data in a preparatory step to isolate data that is relevant to the particular flight event(s) being detected and ultimately reported.

As part of block B57, the mobile device 30 then filters the user-generated or induced motion of the mobile device 30 from the above-noted synthesized data set, doing so using the statistical filter model 50F of FIG. 2, whether in the EFB embodiment noted above or in another suitable tablet computer or other portable configuration. In an illustrative use case, when block B56 includes using the barometer 47 of FIG. 2 to generate a set of barometric pressure readings, i.e., as part of the raw flight data ($FD_{RAW}$), block B57 can include producing filtered flight data ($FD_{FLT}$) as time-stamped takeoff and landing times of the host aircraft 10 determined, via the mobile device 30, based on such barometric pressure readings. Similarly, composite acceleration readings can be processed to produce filtered flight data ($FD_{FLT}$) inclusive of time-stamped turbulence data of the host aircraft 10, in this instance based on the composite acceleration readings.

In the various embodiments, computer-readable instructions are executed by the processor 44 to cause the mobile device 30 to filter out human-induced motion of the mobile device 30 from the raw flight data. As described above, block B57 can entail calculating a rolling standard deviation and applying cutoff thresholds, calculating a rolling average sum of absolute values, and applying thresholds or cutoffs to the rolling average sum, or using other model-based statistical analysis to separate what is likely to be motion of the host aircraft 10 from motion that is likely to be user-generated by interactions with the mobile device 30.

As part of block B57, the mobile device 30 may transmit the filtered flight data ($FD_{FLT}$) to the central data server 34 or another remote user device, such as another mobile device 30 equipped as an addition EFB. Such communication between the mobile device 30 and the central data server 34, or another mobile device in some use cases, can occur in real-time over wireless link, such as Wi-Fi, BLUETOOTH classes, Bluetooth-low-energy (BLE), 802.15.4, infrared channels, satellite bands, etc. Cellular network standards used to communicate among between the mobile device 30, the central data server 34, and other possible systems may include standards that qualify as 1G, 2G, 3G, 4G, 5G. The network standards may qualify as one or more generation of mobile telecommunication standards by fulfilling a specification or standards such as the specifications maintained by International Telecommunication Union. In some embodiments, different types of data may be transmitted via different links and standards. In other embodiments, the same types of data may be transmitted via different links and standards.

At block B58 of FIG. 7, the filtered flight data ($FD_{FLT}$) from block B57 may be communicated from the host aircraft 10 to an end consumer located remotely therefrom. Block B57 may include using the transceiver 36 of FIG. 2, itself coupled to the central data server 34, to disseminate the filtered flight data ($FD_{FLT}$) for consumption by a remote user device 20U located remotely from the mobile device 30 or the host aircraft 10, e.g., via radio broadcast or over a WiMAX-based or other suitable wireless communication network or IP connection supporting the requisite data transfer rates. In a possible embodiment, the ground station(s) 20B and/or communication satellites may serve as internet gateways.

Various use cases may be readily visualized by those skilled in the art in view of the foregoing disclosure. For instance, a consumer of data from the remote user device 20U may be a crewmember of the additional aircraft 20C of FIG. 2, with the transceiver 36 or other suitable communications equipment aboard the host aircraft 10 configured to disseminate the time-stamped filtered flight data ($FD_{FLT}$) to the additional aircraft 20C, e.g., as a radio broadcast or another air-to-air signal transmission.

As used herein, radio broadcasts and air-to-air signal transmissions entail communication over a suitable aviation spectrum frequency or predetermined or dedicated band thereof. Such communications can be direct/point-to-point, or the communications can be assisted by bouncing or relaying a signal transmission off of a satellite, aircraft, and/or ground-based relay station, as appreciated in the art. For instance, within the intended context of "radio broadcast", the host aircraft 10 can send out a radio frequency signal, e.g., in the L-band (1-2 GHz) or another suitable frequency, with the signal propagating to a remote user device 20U with compatible receiving equipment, e.g., a trailing aircraft. This may occur in some instances by bouncing the signal off an orbiting communications satellite, aircraft, or ground station. The 20U device can likewise be one or more of the ATC towers 20A, in which case the transceiver 36 is configured to disseminate the time-stamped filtered flight data ($FD_{FLT}$) to the ATC tower 20A as an air-to-ground signal transmission, again either directly or assisted by relay.

While collection and filtering of the various sensor data may occur in real-time, it is not necessary within the scope of the disclosure to always disseminate the filtered flight data ($FD_{FLT}$) in real-time. That is, for data that is not time-sensitive, the end user may be remote in terms solely of time of collection, with the end user accessing the filtered flight data ($FD_{FLT}$) directly or indirectly from the mobile device 30 and/or the central data sever 34. The event detection logic 50L proceeds to block B60 upon communicating the filtered flight data ($FD_{FLT}$) to the end user 20U of such data.

Block B60 includes determining, via the mobile device 30 and/or the central data server 34, whether flight operations are complete. In a simplified implementation, a user may simply exit out of or close the above-noted app. Alternatively, detection of a sustained period of very low sensory input may be used by the mobile device 30 as being indicative of completed flight operations. The event detection logic 50L then proceeds to block B62.

At block B62, the central data server 34 and/or the mobile device 30 may offload the filtered flight data ($FD_{FLT}$) and possibly the raw data ($FD_{RAW}$) to long-term storage, such as an external database, for more in-depth data analysis or for historical retention.

In still another embodiment, aspects of the subject disclosure can be applied to software app-based updates of other EFBs, as alluded to above. For example, portions of the subject disclosure may be encoded in a computer-readable medium, e.g., the memory 42 of the mobile device 30, as computer-readable instructions executable by the processor 44 to update other EFBs, the latter acting as the remote user device 20U in this instance. In a possible use case, a user of the mobile device 30 may touch a displayed tile or icon to cause the mobile device 30 to process the raw flight data into the synthesized data set according to the method described above, and to filter out human-induced motion of the mobile device 30 from the synthesized data set. This occurs by operation of the above-described filtering model, and has the effect of generating the time-stamped filtered flight data.

The central data server 34, which is in wireless communication with the RF communications circuit 41, then receives the time-stamped filtered flight data from the mobile device 30, with the transceiver 36 ultimately transmitting or otherwise disseminating the filtered flight data set to the remote user device 20U. In this possible use case, the remote user device 20U may be embodied as another EFB, e.g., one that is aboard the host aircraft or possibly aboard another aircraft. Thus, use of a software app executed by the mobile device 30 in this manner could facilitate updating other EFBs as needed. Similarly, a computer-readable medium of the central data server 34 may be programmed with instructions, the execution of which by a processor of the central data server 34 causes the central data server 34 to receive the time-stamped filtered flight data from the mobile device 30, as described above, and to thereafter update one or more mobile devices 30 equipped as EFBs.

Using the flight data system 50 described above, and the accompanying method, one may use the mobile device 30 in its possible capacity as an EFB to extract more information about a flight relative to capabilities such as ADS-B, and can provide data more quickly and easily than, e.g., FDR or AID. Beyond leveraging the sensor suite 40 of the mobile device 30 in the disclosed manner, the present teachings enable automatic identification of human interference with the mobile device 30 when extracting purely flight-related motion information.

Relative to rack-mounted or fixture-mounted sensory systems, that is, the mobile device 30 is intended by design to be portable, hands-on, and interactive, and thus the present solutions account for the extreme motion of the mobile device 30 when deriving the filtered flight data ($FD_{FLT}$). Once the myriad of flight events are detected and sent in real-time to remote user devices, the data can be used for such beneficial purposes as situation awareness tools, e.g., Aircraft Health Management or any international operations tools. These and other benefits will be readily appreciated by those skilled in the art in view of the foregoing disclosure.

The following Clauses provide exemplary configurations of the flight data system 50 and associated method of using the same, with the method being interchangeable with the event detection logic 50L described above.

Clause 1: A flight data system for use aboard a host aircraft, comprising: a mobile device having a processor, memory programmed with computer-readable instructions, a radio frequency (RF) communications circuit, a Global Positioning System (GPS) receiver, and a sensor suite configured to collect raw flight data, wherein execution of the computer-readable instructions by the processor causes the mobile device to process the raw flight data into a synthesized data set, and to filter out human-induced motion of the mobile device from the synthesized data set, using a statistical filtering model, thereby generating time-stamped filtered flight data; a central data server in wireless communication with the RF communications circuit, and configured to receive the time-stamped filtered flight data therefrom; and a transceiver communicatively coupled to the central data server, wherein the transceiver is configured to disseminate the time-stamped filtered flight data to a remote user device.

Clause 2: The flight data system of clauses 1, wherein the mobile device includes a tablet computer or a smartphone.

Clause 3: The flight data system of clauses 1 or 2, wherein the sensor suite includes a barometer configured to generate cabin pressure readings as part of the raw flight data, and wherein the time-stamped filtered flight data includes time-stamped takeoff and landing times of the host aircraft determined, via the mobile device, based on the cabin pressure readings.

Clause 4: The flight data system of any of clauses 1-3, wherein the sensor suite includes a multi-axis accelerometer configured to generate, as part of the raw flight data, a set of composite accelerometer readings, and wherein the time-stamped filtered flight data set includes time-stamped turbulence data of the host aircraft based at least in part on the composite accelerometer readings.

Claim 5: The flight data system of clause 4, wherein execution of the computer-readable instructions by the processor causes the mobile device to filter out the human-induced motion of the mobile device from the synthesized data set by calculating a rolling standard deviation of the composite accelerometer readings.

Clause 6: The flight data system of any of clauses 1-5 or 7-10, wherein execution of the computer-readable instructions by the processor causes the mobile device to filter out the human-induced motion of the mobile device from the synthesized data set by calculating a rolling average of a sum of absolute values of the composite accelerometer readings, and thereafter detecting an attitude of the mobile device using the rolling average.

Clause 7: The flight data system of any of clauses 1-6 or 8-10, wherein the sensor suite includes a gyroscope configured to generate angular rate signals indicative of rotation of the mobile device as part of the raw flight data, and wherein the mobile device is configured to detect the human-induced motion based on the angular rate signals.

Clause 8: The flight data system of any of clauses 1-7 or 8-10, wherein the remote user device is part of an additional aircraft, and wherein the transceiver is configured to disseminate the time-stamped filtered flight data to the additional aircraft as an air-to-air signal transmission.

Clause 9: The flight data system of clause 8 or 10, wherein the air-to-air signal transmission is a radio broadcast.

Clause 10: The flight data system of any of clauses 1-9, wherein the remote user device includes an air traffic control tower, and wherein the transceiver is configured to disseminate the time-stamped filtered flight data to the air traffic control tower as an air-to-ground signal transmission.

Clause 11: A method for collecting and disseminating flight data aboard a host aircraft using a flight data system, the method comprising: collecting Global Positioning System (GPS) data using a GPS receiver aboard the host aircraft; collecting raw flight data via a sensor suite of a mobile device within the flight data system; processing the raw flight data into a synthesized data set; filtering out human-induced motion of the mobile device from the synthesized data set, via a statistical filtering model of the mobile device, to thereby generate time-stamped filtered flight data; wirelessly transmitting the time-stamped filtered flight data to a central data server located aboard the host aircraft, via an RF communications circuit of the mobile device; receiving the time-stamped filtered flight data via the central data server; and disseminating the time-stamped filtered flight data via a transceiver coupled to the central data server, including transmitting an air-to-ground signal to an air traffic control tower and/or broadcasting a message to another aircraft.

Clause 12: The method of clause 11, wherein the sensor suite includes a barometer and collecting the raw flight data via the sensor suite includes collecting cabin pressure readings via the barometer, the method further comprising: generating, as part of the filtered flight data, time-stamped takeoff and landing times of the host aircraft determined based on the cabin pressure readings from the barometer.

Clause 13: The method of clause 11 or 12, wherein the sensor suite includes a multi-axis accelerometer, and collecting the raw flight data via the sensor suite includes collecting composite accelerometer readings from the multi-axis accelerometer, the method further comprising: generating, as part of the filtered flight data, time-stamped turbulence data of the host aircraft based on the composite accelerometer readings.

Clause 14: The method of any of clauses 11-13, wherein filtering out the human-induced motion of the mobile device includes calculating a rolling standard deviation of the accelerometer readings and/or a rolling average of a sum of absolute values of the composite accelerometer readings.

Clause 15: The method of any of clauses 11-14, wherein the sensor suite includes a gyroscope configured to output angular rate signals indicative of rotation of the mobile device, the method further comprising: detecting the human-induced motion via the mobile device based on the angular rate signals.

Clause 16: A computer-readable medium on which is recorded instructions for collecting and disseminating flight data aboard a host aircraft, wherein execution of the instructions by a processor of a mobile device causes the mobile device to: collect Global Positioning System (GPS) data using a GPS receiver; collect raw flight data using a sensor suite; process the raw flight data into a synthesized data set; filter out human-induced motion of the mobile device from the synthesized data set, via a statistical filtering model, to thereby generate time-stamped filtered flight data; and wirelessly transmit the time-stamped filtered flight data to at least one of a user device or central data server located aboard the host aircraft, via an RF communications circuit.

Clause 17: The computer-readable medium of clause 16, wherein the sensor suite includes a barometer and the raw flight data includes cabin pressure readings collected by the barometer, and wherein execution of the instructions causes the mobile device to: generate, as part of the time-stamped filtered flight data, time-stamped takeoff and landing times of the host aircraft determined based on the cabin pressure readings from the barometer.

Clause 18: The computer-readable medium of clauses 16 or 17, wherein the sensor suite includes a multi-axis accelerometer, the raw flight data includes composite accelerometer readings from the multi-axis accelerometer, and wherein execution of the instructions causes the mobile device to: generate, as part of the filtered flight data, time-stamped turbulence data of the host aircraft based on the composite accelerometer readings.

Clause 19: The computer-readable medium of any of clauses 16-18 or 20, execution of the instructions causes the mobile device to filter out the human-induced motion of the mobile device by calculating a rolling standard deviation of the accelerometer readings or a rolling average of a sum of absolute values of the composite accelerometer readings.

Clause 20: The computer-readable medium of any of clauses 16-19, wherein the sensor suite includes a gyroscope configured to output angular rate signals indicative of rotation of the mobile device, and wherein execution of the instructions causes the mobile device to: detect the human-induced motion via the mobile device based on the angular rate signals.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the subject disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A flight data system for use aboard a host aircraft, comprising:
a mobile device having a processor, memory programmed with computer-readable instructions, a radio frequency (RF) communications circuit, a Global Positioning System (GPS) receiver, and a sensor suite configured to collect raw flight data, the sensor suite including a multi-axis accelerometer configured to generate a set of composite accelerometer readings as part of the raw flight data, wherein execution of the computer-readable instructions by the processor causes the mobile device to process the raw flight data into a synthesized data set, and to filter out human-induced motion of the mobile device from the synthesized data set, using a statistical filtering model, including calculating a rolling standard deviation of the set of composite accelerometer readings, thereby generating time-stamped filtered flight data;
a central data server in wireless communication with the RF communications circuit, and configured to receive the time-stamped filtered flight data therefrom; and
a transceiver communicatively coupled to the central data server, wherein the transceiver is configured to disseminate the time-stamped filtered flight data to a remote user device, wherein the time-stamped filtered flight data includes time-stamped turbulence data of the host aircraft based at least in part on the composite accelerometer readings.

2. The flight data system of claim 1, wherein the mobile device includes a tablet computer or a smartphone.

3. The flight data system of claim 1, wherein the sensor suite includes a barometer configured to generate cabin pressure readings as part of the raw flight data, and wherein the time-stamped filtered flight data includes time-stamped takeoff and landing times of the host aircraft determined, via the mobile device, based on the cabin pressure readings.

4. The flight data system of claim 1, wherein the execution of the computer-readable instructions by the processor causes the mobile device to filter out the human-induced motion of the mobile device from the synthesized data set at least in part by calculating a rolling average of a sum of absolute values of the set of composite accelerometer readings, and thereafter detecting an attitude of the mobile device using the rolling average.

5. The flight data system of claim 1, wherein the sensor suite includes a gyroscope configured to generate angular rate signals indicative of rotation of the mobile device as part of the raw flight data, and wherein the mobile device is configured to detect the human-induced motion based on the angular rate signals.

6. The flight data system of claim 1, wherein the remote user device is accessible to or by a crewmember of an additional aircraft, and wherein the transceiver is configured to disseminate the time-stamped filtered flight data to the additional aircraft as an air-to-air signal transmission.

7. The flight data system of claim 6, wherein the air-to-air signal transmission is a radio broadcast.

8. The flight data system of claim 1, wherein the remote user device includes an air traffic control tower, and wherein the transceiver is configured to disseminate the time-stamped filtered flight data to the air traffic control tower as an air-to-ground signal transmission.

9. A method for collecting and disseminating flight data aboard a host aircraft using a flight data system, the method comprising:
collecting Global Positioning System (GPS) data using a GPS receiver aboard the host aircraft;
collecting raw flight data via a sensor suite of a mobile device within the flight data system, including using a multi-axis accelerometer to generate a set of composite accelerometer readings as part of the raw flight data;
processing the raw flight data into a synthesized data set;
filtering out human-induced motion of the mobile device from the synthesized data set, via a statistical filtering model of the mobile device, to thereby generate time-stamped filtered flight data, including calculating a rolling standard deviation of the set of composite accelerometer readings;
generating, as part of the filtered flight data, time-stamped turbulence data of the host aircraft based on the composite accelerometer readings;
wirelessly transmitting the time-stamped filtered flight data to a central data server located aboard the host aircraft, via an RF communications circuit of the mobile device;
receiving the time-stamped filtered flight data via the central data server; and
disseminating the time-stamped filtered flight data via a transceiver coupled to the central data server, including at least one of transmitting an air-to-ground signal to an air traffic control tower or broadcasting a message to an additional aircraft, wherein the time-stamped filtered flight data includes time-stamped turbulence data of the host aircraft based at least in part on the composite accelerometer readings.

10. The method of claim 9, wherein the sensor suite includes a barometer and collecting the raw flight data via the sensor suite includes collecting cabin pressure readings via the barometer, the method further comprising:
generating, as part of the time-stamped filtered flight data, time-stamped takeoff and landing times of the host aircraft determined based on the cabin pressure readings from the barometer.

11. The method of claim 9, wherein filtering out the human-induced motion of the mobile device also includes calculating a rolling average of a sum of absolute values of the composite accelerometer readings.

12. The method of claim 9, wherein the sensor suite includes a gyroscope configured to output angular rate signals indicative of rotation of the mobile device, the method further comprising:
detecting the human-induced motion via the mobile device based on the angular rate signals.

13. The method of claim 9, the method including:
disseminating the time-stamped filtered flight data by broadcasting the message to the additional aircraft.

14. The method of claim 9, the method including:
disseminating the time-stamped filtered flight data by transmitting the air-to-ground signal to the air traffic control tower.

15. A non-transitory computer-readable storage medium comprising executable instructions, wherein execution of the executable instructions causes a mobile device onboard a host aircraft to:
collect Global Positioning System (GPS) data using a GPS receiver;
collect raw flight data using a sensor suite, the sensor suite including a multi-axis accelerometer configured to generate composite accelerometer readings, wherein execution of the executable instructions causes the mobile device onboard the host aircraft to:
generate, as part of the filtered flight data, time-stamped turbulence data of the host aircraft based on the composite accelerometer readings;
process the raw flight data into a synthesized data set;
filter out human-induced motion of the mobile device from the synthesized data set, via a statistical filtering model, including calculating a rolling standard deviation of the set of composite accelerometer readings, to thereby generate time-stamped filtered flight data; and
wirelessly transmit the time-stamped filtered flight data to a user device located aboard the host aircraft via an RF communications circuit, wherein the time-stamped filtered flight data includes time-stamped turbulence data of the host aircraft based at least in part on the composite accelerometer readings.

16. The non-transitory computer-readable storage medium of claim 15, wherein the sensor suite includes a barometer and the raw flight data includes cabin pressure readings collected by the barometer, wherein execution of the executable instructions causes the mobile device onboard the host aircraft to: generate, as part of the time-stamped filtered flight data, time-stamped takeoff and landing times of the host aircraft determined based on the cabin pressure readings from the barometer.

17. The non-transitory computer-readable storage medium of claim 16, wherein execution of the executable instructions causes the mobile device onboard the host aircraft to: filter out the human-induced motion of the mobile device at least in part by calculating a rolling average of a sum of absolute values of the composite accelerometer readings.

18. The non-transitory computer-readable storage medium of claim 15, wherein the sensor suite includes a gyroscope configured to output angular rate signals indicative of rotation of the mobile device, wherein execution of the executable instructions causes the mobile device onboard the host aircraft to:

detect the human-induced motion via the mobile device based on the angular rate signals.

19. The non-transitory computer-readable storage medium of claim 15, wherein the execution of the executable instructions causes a transceiver located onboard the host aircraft to:

disseminate the time-stamped filtered flight data to an additional aircraft as an air-to-air signal transmission.

20. The non-transitory computer-readable storage medium of claim 15, wherein the execution of the executable instructions causes a transceiver located onboard the host aircraft to:

transmit an air-to-ground signal to a ground station.

* * * * *